United States Patent [19]

Ko et al.

[11] Patent Number: 5,677,416
[45] Date of Patent: Oct. 14, 1997

[54] FLAME-RETARDANT WHOLLY AROMATIC POLYESTER AND METHOD FOR PREPARING THE SAME

[75] Inventors: Young-Hoon Ko; Seonkyeong Cheong, both of Taejeon, Rep. of Korea

[73] Assignee: Korea Kumho Petrochemical Co., Ltd., Seoul, Rep. of Korea

[21] Appl. No.: 744,737

[22] Filed: Oct. 30, 1996

[30] Foreign Application Priority Data

Feb. 26, 1996 [KR] Rep. of Korea .................. 96-4706

[51] Int. Cl.$^6$ ............................................ C08G 63/00
[52] U.S. Cl. .................... 528/185; 528/167; 528/180; 528/182; 528/185; 528/190; 528/191; 528/195; 528/201; 528/274; 528/275; 528/287; 528/291; 528/298; 528/308; 528/308.6; 528/398; 528/403; 524/714; 524/792
[58] Field of Search ........................... 528/168, 180, 528/182, 185, 190, 191, 195, 201, 274, 275, 287, 291, 298, 308, 308.6, 398, 403; 524/714, 792

[56] References Cited

U.S. PATENT DOCUMENTS

| | | | |
|---|---|---|---|
| 3,133,898 | 5/1964 | Keck | 528/194 |
| 3,234,168 | 2/1966 | Hare | 260/30.4 |
| 3,317,464 | 5/1967 | Conix | 528/176 |
| 3,324,168 | 6/1967 | Muller et al. | 554/111 |
| 3,553,167 | 1/1971 | Schnell et al. | 528/176 |
| 3,702,838 | 11/1972 | Wilson | 528/180 |
| 3,733,306 | 5/1973 | Wolfes et al. | 528/173 |
| 3,975,487 | 8/1976 | Cottis et al. | 264/210.6 |
| 4,049,629 | 9/1977 | Pawlak et al. | 528/195 |
| 4,051,107 | 9/1977 | Pawlak et al. | 528/195 |
| 4,229,565 | 10/1980 | Gardner et al. | 528/176 |

OTHER PUBLICATIONS

Morgan, "Interfacial Polycondensation", J. Macromol. Sci–Chem, pp. 683–699 (1981).
Medici, "Functionalization of Phosphazenes", Macromolecules, 1992, pp. 2569–2574.
Kumar, "Aromatic Cyclolinear Phosphazene Polyamides", Macromolecules, 1995, pp. 6323–6329.
Kumar, "Aromatic Polyamides", Polymer, 1991, pp. 247–248.

*Primary Examiner*—Samuel A. Acquah
*Attorney, Agent, or Firm*—Harrison & Egbert

[57] ABSTRACT

There are disclosed a wholly aromatic polyester represented by formula I with enhanced flame retardance and chemical stability, and a method for the preparing the same. The polymer is prepared in interface polymerization wherein an alkali aqueous phase containing cyclotriphosphagene-containing bisphenols is in contact with an organic phase containing aromatic dicarboxylic acid chlorides in the presence of a phase transfer catalyst.

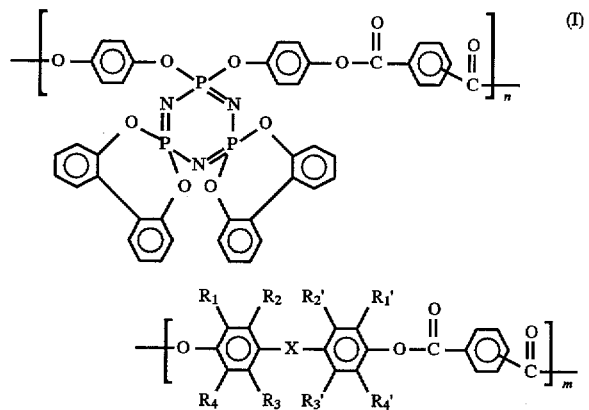

wherein m and n each are an integer which satisfies the following conditions: $0<m/(m+n)<1$ and $0<n/(m+n)<1$; X represents —O—, —S—, —SO$_2$—, —SO—, —CO—, an alkylene group of $C_{1-4}$, or an alkylidene group of $C_{1-4}$; and $R_1, R_2, R_3, R_1', R_2', R_3'$ and $R_4'$ are the same or different, and represent a hydrogen atom, a halogen atom, or an alkyl group of $C_{1-4}$ or the derivatives thereof, respectively.

6 Claims, No Drawings

FLAME-RETARDANT WHOLLY AROMATIC POLYESTER AND METHOD FOR PREPARING THE SAME

BACKGROUND OF THE INVENTION

1. Field of the Invention

The present invention relates to a wholly aromatic polyester with enhanced flame-retardancy and chemical stability. More particularly, the present invention relates to a wholly aromatic polyester in which cyclotriphosphazene compounds are introduced to the main chain of aromatic polyester comprising aromatic dicarboxylic acid or its derivatives and a bisphenol or its derivatives. Also, the present invention is concerned with a method for preparing the wholly aromatic polyester.

2. Description of the Prior Art

Wholly aromatic polyesters, which are typically prepared by polycondensing aromatic diols with aromatic dicarboxylic acid, are known to be superior in thermal properties, such as heat distortion temperature and thermal decomposition temperature, mechanical properties, such as tensile strength, elongation, flexural rigidity, flexural recovery and impact resistance, dimensional stability, flame retardancy, transparency, and electrical properties. By virtue of these properties, wholly aromatic polyesters are useful for a plurality of purposes including materials for injection, compression and extrusion molding, films, fibers and coating materials.

A method for preparing wholly aromatic polyesters comprising polycondensing aromatic dicarboxylic acid and aromatic diol includes solution polymerization, melt polymerization and interfacial polymerization. A description will be given of such polymerization methods below.

First, solution polymerization is generally carried out by dissolving aromatic dicarboxylic acids treated with acyl chloride and aromatic diols in a suitable organic solvent and adding a base such as pyridine or triethylamine to react the mixture in solution. Depending on the reaction solvent and temperature employed, such solution polymerization is classified into a low temperature solution polymerization and a high temperature solution polymerization. The low temperature solution polymerization comprises polycondensing at low temperature of −10° to 30° C. by using tetrahydrofuran as a solvent, as disclosed in U.S. Pat. Nos. 3,234,168, 4,049,629 and 4,051,107. In contrast, the high temperature solution polymerization comprises polycondensing at high temperature of 215° to 220° C. by using a solvent having high boiling point, such as dichlorobenzene and ditolyl methane, as suggested in U.S. Pat. Nos. 3,133,898, 3,702, 838 and 3,733,306.

However, such solution polymerization methods are economically unfavorable, since it is difficult to yield large molecular weight polymers and costs of recovery and purification of the solvents are high.

Secondly, melt polymerization is suggested in Japanese Pat. Publication Nos. 38-15247, 43-28199 and 53-35798 and U.S. Pat. Nos. 3,317,464, 3,975,487 and 3,553,167 in which compounds diacetated from aromatic diols and aromatic dicarboxylic acids, or compounds diphenylesterified from aromatic diols and aromatic dicarboxylic acids, are subjected to polycondensation at 220° to 330° C. in the presence of a catalyst. However, such melt polymerization has difficulty in obtaining high molecular weight polymers because, as the polymerization proceeds, the melt viscosity of the product increases, and thus stirring is difficult. In addition, the high reaction temperature results in poor colors of the polymers produced.

Thirdly, interfacial polymerization is comprised of dissolving aromatic dicarboxylic chlorides resulting from the treatment of aromatic dicarboxylic acids with acyl chloride in organic solvents immiscible with water and then adding this solution to a solution of aromatic diols in an aqueous sodium hydroxide with vigorous stirring. If necessary, a phase transfer catalyst such as quaternary ammonium salt is used. This polymerization is disclosed in P. W. Morgan, J. Marcromol. Sci. Chem, A15, 683 (1981); H. B. Tasi and Y. D. Lee, J. Polym. Sci., Poly. Chem. Ed. 1987, 25, 1505; and in U.S. Pat. No. 4,229,565. This polymerization has such advantages that the reaction proceeds fast even at room temperature, a polymer having high molecular weight is easily obtainable, the purity of raw materials is not so problematic and also the molecular weight of polymer can be easily controlled.

Of the above three polymerizations, in solution polymerization (R. L. Holzberlein, Polymer prepr., 30(10), 293 (1989)) or melt polymerization is introduced phosphorous compounds into the main chain of the aromatic polyester, but it is well known to use the polymerization. However, as mentioned above, high temperature or low pressure is required for the solution polymerization or the melt polymerization. In addition, the aromatic polyesters obtained by these polymerization methods are usually poor in colors.

SUMMARY OF THE INVENTION

The present invention is based on the finding that the introduction of cyclotriphosphazene into the backbone of the wholly aromatic polyester significantly enhances its flame retardancy and can be accomplished by interfacial polymerization.

Accordingly, it is an object of the present invention to provide a wholly aromatic polyester containing cyclotriphosphazene, represented by the following general formula I:

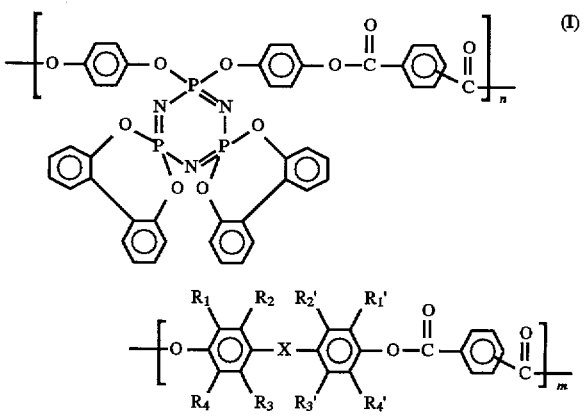

wherein m and n each are an integer which satisfies the following conditions:

$0 < m/(m+n) < 1$ and $0 < n/(m+n) < 1$;

X represents —O—, —S—, —SO$_2$—, —SO—, —CO—, an alkylene group of C$_{1-4}$, or an alkylidene group of C$_{1-4}$; and R$_1$, R$_2$, R$_3$, R$_4$, R$_1$', R$_2$', R$_3$' and R$_4$' are the same or different, and represent a hydrogen atom, a halogen atom, or an alkyl group of C$_{1-4}$ or the derivatives thereof, respectively.

It is another object of the present invention to provide a method for preparing a wholly aromatic polyester represented by general formula I, comprising interfacial polymerizing the cyclotriphosphazene compound (2,2,4,4-bisspiro(2',2"-dioxy-1'1"-biphenyl)-6,6-bis(4-hydroxyphenoxy)cyclotriphosphazene) represented by the following structural formula II:

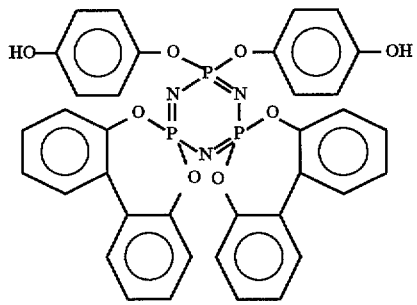

(II)

and a bisphenol represented by the following general formula III:

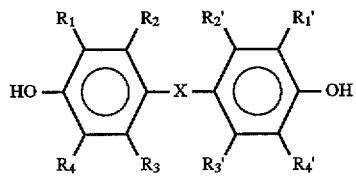

(III)

wherein X is as defined above; and $R_1$, $R_2$, $R_3$, $R_4$, $R_1'$, $R_2'$, $R_3'$ and $R_4'$ are as defined above, with aromatic dicarboxylic acid chlorides in the presence of a phase transfer catalyst.

BRIEF DESCRIPTION OF THE DRAWINGS

Other objects and aspects of the invention will become apparent from the following description of embodiments with reference to the accompanying drawings in which:

FIG. 1A is a $^1$H-NMR spectrum of the aromatic polyester as prepared in Example I using the mole ratio 1:9 of BPA:HPCTP;

FIG. 1B is a $^1$H-NMR spectrum of the aromatic polyester as prepared in Example II using the mole ratio 5:5 of BPA:HPCTP;

FIG. 1C is a $^1$H-NMR spectrum of the aromatic polyester as prepared in Example III using the mole ratio 0:10 of BPA:HPCTP; and FIG. 1D is a $^1$H-NMR spectrum of the aromatic polyester as prepared in Comparative Example I using the mole ratio 10:0 of BPA:HPCTP.

DETAILED DESCRIPTION OF THE INVENTION

The introduction of cyclotriphosphazene into the main chain of wholly aromatic polyester can be accomplished by using a bisphenol containing cyclotriphosphazene as a material for the polymerization. In the present invention, 2,2,4,4-bisspiro(2',2"-dioxy-1',1"-biphenyl)-6,6-bis(4-hydroxyphenoxy)cyclotriphosphazene (hereinafter referred to as "HPCTP"), represented by the following structural formula II:

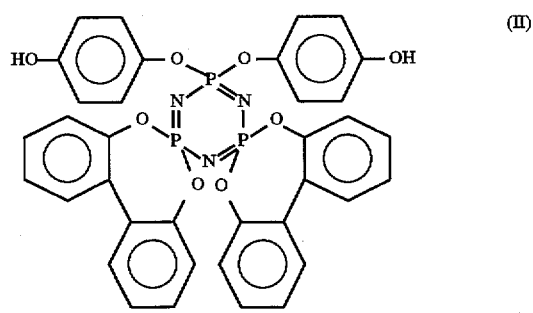

(II)

is used for the polymerization and synthesized as shown in the following reaction scheme:

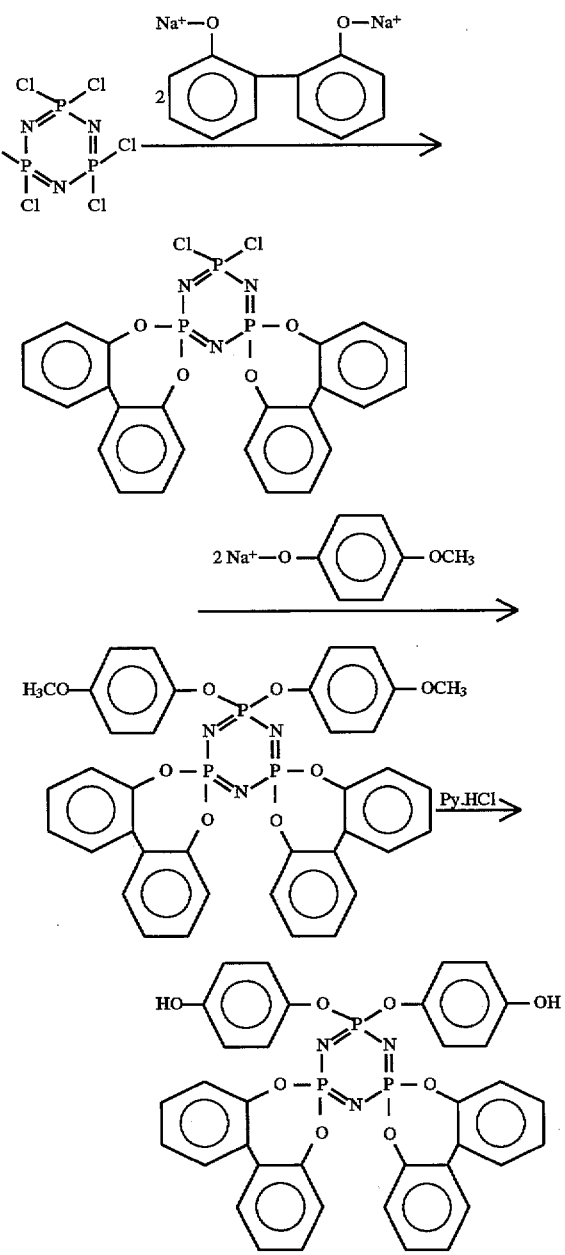

This reaction procedure is suggested by Devendra Kumar et al., Polymer prepr., 36, 247 (1995); Devendra Kumar et al., Macromolecules, 28, 6323 (1995); Alessandro Medici et al., Macromolecules, 25, 2569 (1992); and Kameneva T M et al, SU 1048679 (1984).

Besides the cyclotriphosphazene-containing bisphenols, the bisphenols represented by the following general formula III:

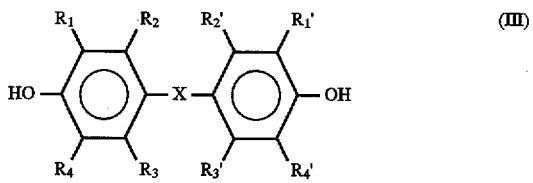

wherein X represents —O—, —S—, —SO$_2$—, —SO—, —CO—, an alkylene group of C$_{1-4}$, or an alkylidene group of C$_{1-4}$; R$_1$, R$_2$, R$_3$, R$_4$, R$_1'$, R$_2'$, R$_3'$ and R$_4'$ are the same or different, and represent a hydrogen atom, a halogen atom, or an alkyl group of C$_{1-4}$ or the derivatives thereof, respectively, are employed as an alcohol component for the wholly aromatic polymer, according to the present invention.

The cyclotriphosphazene-containing wholly aromatic polyester of the above general formula I is prepared by an interfacial polymerization method, wherein, a mixture in which the molar ratio of the cyclotriposphazene-containing bisphenol of the general formula II and the bisphenol of the general formula III ranges from 1:9 to 10:0 is dissolved in an alkali aqueous solution and then mixed with an aromatic dicarboxylic acid chloride solution in the presence of a phase transfer catalyst. In this system, the aromatic dicarboxylic acid chloride may be obtained by adding aromatic dicarboxylic acid to a methylene chloride solution. As a phase transfer catalyst, tetra-n-butylammonium bromide (hereinafter referred to as "TBAB") is used.

In preparation of cyclotriphosphazene-containing aromatic polyester by such an interfacial polymerization the concentrations of the monomers in the alkali aqueous solution and in the methylene chloride are suitable 5 to 20% by weight, respectively.

As the aromatic dicarboxylic acid chlorides, for example, terephthalic acid chloride and isophthalic acid chloride may be used. In this case, it is preferred that the equivalents of terephthalic acid chloride and isophthalic acid chloride as aromatic dicarboxylic acid chlorides are the same as those of bisphenoles. Therefore, the preferred ratio of the bisphenols to terephthalic acid chloride to isophthalic acid chloride ranges from 10:9:1 to 10:1:9.

The amount of the phase transfer catalyst in solvent immiscible with water is preferably 0.5 to 1.0% by mole relative to that of the bisphenols used. The most preferred phase transfer catalyst is TBAB.

With reference to FIG. 1, there are proton-nuclear magnetic resonance ($^1$H-NMR) spectra showing the amounts of the bisphenol A (hereinafter referred to as "BPA") within the wholly aromatic polyester produced. As shown in these spectra, the amplitude of the peak around 1.7 ppm is in proportion to the mole ratio of the BPA. That is, as the mole ratio of the BPA decreases, the peak around 1.7 ppm becomes smaller. Particularly, when BPA is not added, no peak is detected around 1.7 ppm as shown in FIG. 1C. Therefore, these spectra allow one to expect the content of the BPA or cyclortriphosphazene compound within the wholly aromatic polyesters produced.

To assay the thermal properties of the cyclotriphosphazene-containing wholly aromatic polyesters produced according to the present invention, their glass transition temperatures (T$_g$) were measured in a nitrogen atmosphere by using a differential scanning calorimeter (hereinafter referred to as "DSC") with the temperature increasing at a rate of 10° C./min. Also, the amount of the residue at 700° C. (T$_{700°C.}$) of the wholly aromatic polyester was measured, in air, by the use of a thermal gravimetric analyzer (hereinafter referred to as "TGA").

In order to test for flame-retardancy of the cyclotriphosphazene-containing wholly aromatic polyester of the present invention, the flame-retardancy was determined according to UL-94 in such a manner that, after a sample with a dimension of 1/16×1/2×5(thick×width×long) inches was fired, the time that it took from removal of the fire source till extinction was measured, as disclosed in Japanese Pat. Publication No. Heisei 4-493 and U.S. Pat. No. 4,171,330.

It was found that the addition of HPCTP allowed the peaks corresponding to crystallization and melting to be read on DSC graphs for the cyclotriphosphazene-containing polyester polymerized according to the present invention. As the molar ratio of HPCTP increases, the polyester of interest has a higher T$_g$. TGA analysis for the cyclotriphosphazene-containing wholly aromatic polyester in air shows that the residual amount at 700° C. increases with the content of HPCTP. From this fact, it is expected that the introduction of HPCTP into the backbone of wholly aromatic polyester significantly enhances its flame-retardancy.

A better understanding of the present invention may be obtained in light of following examples which are set forth to illustrate, but are not to be construed to limit, the present invention.

SYNTHESIS EXAMPLE I

An aqueous solution layer was prepared by dissolving 9.12 g of sodium hydroxide and then 21.23 g of 2,2'-dihydroxy-1,1'-biphenyl in 300 ml of distilled water. To this solution, 1.74 g of TBAB was added as a phase transfer catalyst. The resulting aqueous solution was dropwise added at room temperature under nitrogen atmosphere to a solution of 17.94 g of hexachlorocyclotriphosphazene dissolved in 300 ml of para-dichlorobenzene. The resulting reactant was vigorously stirred at room temperature for 3 hrs and then, at 70° C. for another 3 hrs. 63 ml of conc. hydrochloric acid was added to the reaction mixture to quench the reaction which was then distilled under reduced pressure to remove the solvent. The solid thus obtained was washed with 5% potassium hydroxide and distilled water and then recrystallized in acetone, to obtain 23.7 g of a product as a white crystal: Yield 80%.

By IR spectra was confirmed the presence of P-N-P groups in the compound obtained. Also, the melting point was measured by DSC to identify it as a single compound (m.p.=320° C.). Its structure was analyzed through proton- and phosphorous-NMR spectroscopy and found to be represented by 2,2,4,4-bisspiro(2',2"-dioxy-1',1"-biphenyl)-6,6-dichlorocyclotriphosphazene. The mass of the product (m/e) was 574 as determined by mass spectroscopy.

SYNTHESIS EXAMPLE II

To the mixed reaction solution of which 2,2,4,4-bisspiro (2',2"-dioxy-1',1"-biphenyl)-6,6-dichlorocyclotriphosphazene synthesized in Synthesis Example I was slowly dropwise added a solution of 13.17 g of 4-methoxyphenol in 100 ml of the aqueous solution dissolving 4.56 g of sodium hydroxide at room temperature through an additional funnel. This reactant was vigorously stirred at room temperature for 3 hrs and then, at 70° C. for another 3 hrs. After cooling the reaction mixture to room temperature, 10 ml of acetic acid was added and distilled under reduced pressure to remove the solvent. The solid thus obtained was washed with 5% potassium hydroxide, distilled water and methanol to obtain a white solid as powder. Thereafter, the solid was washed and dried at 70° C. in a vacuum oven, to obtain 31.71 g of 2,2,4,4-bisspiro(2',2"-dioxy-1',1"-biphenyl)-6,6-bis(4-methoxyphenoxy)cyclotriphosphazene: Yield 82%.

By IR spectra was confirmed the presence of P-N-P groups in the compound obtained. Proton-NMR and phosphorous NMR showed the substitution of the cyclotriphosphazene ring. The melting point was measured by DSC to identify it as a single compound (m.p.=215.5° C). The mass of the product (m/e) was 749 as determined by mass spectroscopy.

SYNTHESIS EXAMPLE III 20 g of the purified 2,2,4,4-bisspiro(2',2"-dioxy-1',1"-biphenyl)-6,6-bis(4-methoxyphenoxy)cyclotriphosphazene was mixed with 160 g of pyridinium chloride to reflux at a temperature of 210° to 245° C. for about 10 hrs. 500 ml of 10 hydrochloric acid was added to quench the reactant which was then filtered to obtain a solid. The produced solid was washed many times with methanol and dried at 70° C. in a vacuum oven, to give 18.66 g of 2,2,4,4-bisspiro(2',2"-dioxy-1',1"-biphenyl)-6,6-bis(4-hydroxyphenoxy)cyclotriphosphazene, pale gray solid of powder: Yield 97%.

By IR spectra were confirmed the presence of P-N-P groups as well as the creation of an —OH group, in the compound obtained. The melting point was measured by DSC to identify it as a single compound (m.p.=318° C). The mass of the product (m/e) was 721 as determined by mass spectroscopy.

SYNTHESIS EXAMPLE IV

After 5 g of the purified 2,2,4,4-bisspiro(2',2"-dioxy-1',1"-biphenyl)-6,6-bis(4-methoxyphenoxy)cyclotriphosphazene was dissolved in 130 ml of anhydrous methylene chloride, 3.51 g of borontribromide was slowly dropwise added at room temperature. Thereafter, the mixture was stirred at room temperature for 10 hrs and distilled under reduced pressure to remove the solvent. The produced solid was washed with methanol and dried at 70° C. in a vacuum oven, to obtain 4.09 g of a white solid: Yield 85%. It was found to have P-N-P groups and an —OH group through the analysis of IR spectra. The melting point of the product was measured by DSC to identify it as a single compound(mp=305° C.).

SYNTHESIS EXAMPLE V

After 0.5 g of 2,2,4,4-bisspiro(2',2"-dioxy-1',1"-biphenyl)-6,6-bis(4-methoxyphenoxy)cyclotriphosphazene was dissolved in 30 ml of anhydrous chloroform, 0.2 ml of trymethylsilyl iodide was slowly dropwise added. Following addition, the solution was stirred at reflux temperature for about 10 hrs and then, quenched by adding 10% hydrochloric acid to stop the reaction. IR-spectra and proton-NMR spectra analyses showed that —OH group was not created, although the group must be created.

Example I 4.10 g of BPA, 1.50 g of HPCTP obtained in Synthesis Example III (BPA:HPCTP=9:1, mole ratio), and 1.66 g of sodium hydroxide were dissolved in 50 ml of distilled water. To this solution was immediately added a solution of 0.034 g of TBAB as a phase transfer catalyst and each 2.54 g of isophthalic acid dichloride and terephthalic acid dichloride in 100 ml of dichloromethane. After completing addition, the mixture was vigorously stirred to react at room temperature, and then the reaction mixture was stood under the atmospheric pressure, to induce phase separation. The organic solution thus separated was taken and washed with an alkali aqueous solution and then, with acid aqueous solution, to remove unreacted materials and by-products. This washed organic solution was precipitated in methanol, to obtain 7.1 g of white precipitate. The resulting precipitate was dried at 70° C. in a vacuum oven, to obtain wholly aromatic polyester containing cyclotriphosphazene. This polymer was confirmed by proton-NMR spectroscopy. The result is shown in FIG. 1A and the molecular weight of the polymer is listed in Table 1 below.

Example II

The reactants were polymerized in the same procedure as Example I to obtain 9.5 g of a white solid, except that HPCTP and BPA were added in a mole ratio of 5:5. The $^1$H-NMR spectrum and the molecular weight of this polymer are given as shown in FIG. 1B and Table 1, respectively.

Example III

The reactants were polymerized in the same procedure as Example I to obtain 10.8 g of a white solid, except that only HPCTP was added. The $^1$H-NMR spectrum and the molecular weight of this plolymer are given as shown in FIG. 1C and Table 1, respectively.

Comparative Example I

The reactants were polymerized in the same procedure as Example I to obtain 8.5 g of a white solid, except that BPA was used, while HPCTP was not used. The $^1$H-NMR spectrum and the molecular weight of this polymer are given as shown in FIG. 1D and Table 1, respectively.

TABLE 1

| Polymer | Bisphenols (moles) | | Molecular Weight ($\times 10^3$) |
|---------|-------|-----|------|
|         | HPCTP | BPA |      |
| Exmp I   | 1  | 9  | 7.0  |
| Exmp II  | 5  | 5  | 10.2 |
| Exmp III | 10 | 0  | 8.6  |
| C.Exmp I | 0  | 10 | 44.6 |

Test Example I

The glass transition temperatures ($T_g$) of the wholly aromatic polyesters obtained in Examples I to III and Comparative Example I were measured in nitrogen atmosphere by DSC while the temperature was elevated at a rate of 10° C./min. The results are given as shown in Table 2, below.

Test Example II

The amounts of the remainder at 700° C. ($R_{700°C}$) for the wholly aromatic polyesters obtained in Examples I to III and Comparative Example I were measured in air by TGA while the temperature was elevated at a rate of 10° C./min. The results are given as shown in Table 2, below.

Test Example III

Samples of the wholly aromatic polyesters obtained in Examples I to III and Comparative Example I were tested for flame retardancy, in accordance with UL-94, Evaluation method for flame retardancy. After the samples were fired, the time that it took from removal of the fire source till extinction was measured. The results are given as shown in Table 2 below.

Referring to Table 2, the extinction time of the wholly aromatic polymer obtained without addition of HPCTP is longer than those of the cyclotriphosphazene-containing wholly aromatic polymers obtained according to the present invention. In addition, the larger the mole ratio of HPCTP, the shorter the extinction time. Therefore, the introduction of HPCTP into wholly aromatic polyester results in a significant improvement in flame retardancy.

TABLE 2

| Polymer | Test I DSC $T_g$ (°C.) | Test II TGA $R_{700°\,C.}$ (%) in air | | Test III Extinc. time after removal of fire source | UL-94 Grade |
| --- | --- | --- | --- | --- | --- |
| Exmp I | 174.6 | 6.1 | | 2 sec | V-0 |
| Exmp II | 192.8 | 19.4 | 5 | 0 sec | V-0 |
| Exmp III | 206.8 | 35.1 | 0 | 0 sec | V-0 |
| C.Exmp I | 190.2 | 0 | | 10 sec | V-1 |

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A wholly aromatic polyester containing cyclotriphosphazene, represented by the following general formula I:

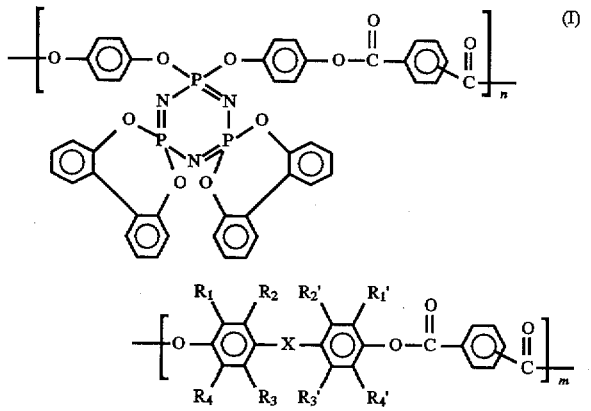

wherein m and n each are an integer which satisfies the following conditions:

$0 \leq m/(m+n) < 1$ and $0 < n/(m+n) \leq 1$;

X represents —O—, —S—, —SO$_2$—, —SO—, —CO—, an alkylene group of $C_{1-4}$, or an alkylidene group of $C_{1-4}$;

$R_1$, $R_2$, $R_3$, $R_4$, $R_1'$, $R_2'$, $R_3'$ and $R_4'$ are the same or different, and represent a hydrogen atom, a halogen atom, or an alkyl group of $C_{1-4}$ or the derivatives thereof, respectively.

2. A method for preparing a wholly aromatic polyester represented by the following general formula I:

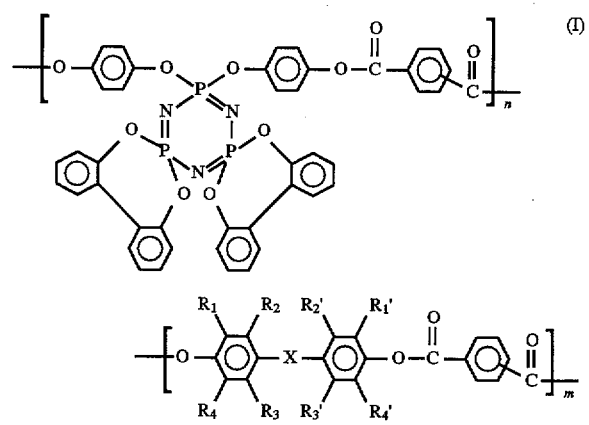

wherein m and n each are an integer which satisfies the following conditions:

$0 \leq m/(m+n) < 1$ and $0 < n/(m+n) \leq 1$;

X represents —O—, —S—, —SO$_2$—, —SO—, —CO—, an alkylene group of $C_{1-4}$, or an alkylidene group of $C_{1-4}$; and $R_1$, $R_2$, $R_3$, $R_4$, $R_1'$, $R_2'$, $R_3'$ and $R_4'$ are the same or different, and represent a hydrogen atom, a halogen atom, or an alkyl group of $C_{1-4}$ or the derivatives thereof, respectively, comprising interface polymerizing a cyclotriphosphazene compound (2,2,4,4-bisspiro(2',2"-dioxy-1',1"-biphenyl)-6,6-bis(4-hydroxyphenoxy)cyclotriphosphazene) represented by the following structural formula II:

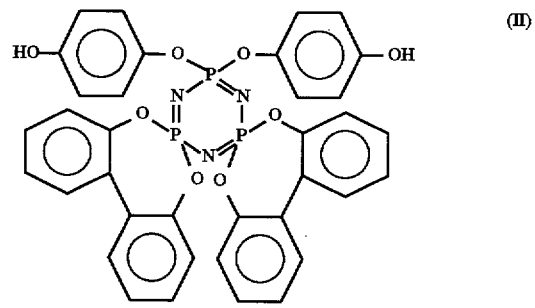

and a bisphenol represented by the following general formula III:

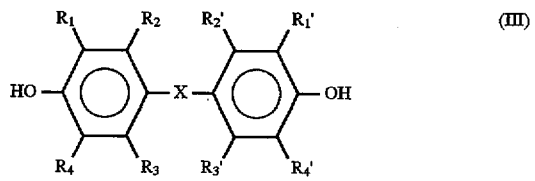

wherein X is as defined above; and $R_1$, $R_2$, $R_3$, $R_4$, $R_1'R_2'$, and $R_3'$ and $R_4'$ are as defined above, with aromatic dicarboxylic acid chlorides in the presence of a phase transfer catalyst.

3. The method in accordance with claim 2, wherein said interface polymerization occurs between an alkali aqueous solution of said bisphenol and a solution of said aromatic dicarboxylic acid chloride in a methylene chloride including said phase transfer catalyst.

4. The method in accordance with claim 2, wherein the mole ratio of said cyclotriphosphazene represented by general formula II to said bisphenol represented by general formula III ranges from 1:9 to 10:0.

5. The method in accordance with claim 3, wherein said phase transfer catalyst is tetra-n-butylammonium bromide and is used at an amount of 0.05 to 1.0% by mole relative to the amount of the used bisphenol.

6. The method in accordance with claim 3, wherein said aromatic dicarboxylic acid chloride is a mixture of terephthalic acid dichloride and isophthalic acid dichloride and the mole ratio therebetween ranges from 9:1 to 1:9.

* * * * *